(12) United States Patent
Kim (10) Patent No.: US 12,506,193 B2
(45) Date of Patent: Dec. 23, 2025

(54) RECHARGEABLE BATTERY PACK

(71) Applicant: SAMSUNG SDI CO., LTD., Yongin-si (KR)

(72) Inventor: Young Deok Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 15 days.

(21) Appl. No.: 18/488,787

(22) Filed: Oct. 17, 2023

(65) Prior Publication Data

US 2024/0339694 A1 Oct. 10, 2024

(30) Foreign Application Priority Data

Apr. 5, 2023 (KR) .................. 10-2023-0044904

(51) Int. Cl.
*H01M 10/6562* (2014.01)
*H01M 10/613* (2014.01)
*H01M 50/119* (2021.01)
*H01M 50/209* (2021.01)
*H01M 50/224* (2021.01)
*H01M 50/231* (2021.01)
*H01M 50/264* (2021.01)

(52) U.S. Cl.
CPC ..... *H01M 10/6562* (2015.04); *H01M 10/613* (2015.04); *H01M 50/119* (2021.01); *H01M 50/209* (2021.01); *H01M 50/224* (2021.01); *H01M 50/231* (2021.01); *H01M 50/264* (2021.01)

(58) Field of Classification Search
CPC .......... H01M 10/6562; H01M 10/613; H01M 50/119; H01M 50/509; H01M 50/564
See application file for complete search history.

(56) References Cited

U.S. PATENT DOCUMENTS

| | | | |
|---|---|---|---|
| 2018/0241104 A1 | 8/2018 | Yamashita et al. | |
| 2020/0203788 A1* | 6/2020 | Kang ............... | H01M 10/6551 |
| 2022/0223972 A1* | 7/2022 | Zhu .................... | H01M 50/367 |
| 2022/0396682 A1 | 12/2022 | Ashida et al. | |

(Continued)

FOREIGN PATENT DOCUMENTS

| | | | |
|---|---|---|---|
| JP | 6390549 B2 | 9/2018 | |
| JP | 2022094716 A | * | 6/2022 |

(Continued)

OTHER PUBLICATIONS

English translation of KR20240083790A—Battery module and battery pack including the same; Jun. 12, 2024 with priority to Dec. 5, 2022 (Year: 2024).*

(Continued)

*Primary Examiner* — Adam J Francis
(74) *Attorney, Agent, or Firm* — Womble Bond Dickinson (US) LLP (57) ABSTRACT

A rechargeable battery pack includes: a plurality of battery cells, each of the battery cells including a cell vent; a pack frame accommodating the battery cells and including a pack vent; and a pack cover coupled to the pack frame and covering the battery cells. The pack cover includes a first member formed of a first elongation material having a first elongation and a second member formed of a second elongation material having a second elongation that is larger than the first elongation.

15 Claims, 5 Drawing Sheets

(56) References Cited

U.S. PATENT DOCUMENTS

| | | | |
|---|---|---|---|
| 2023/0282927 A1 | 9/2023 | Shin et al. | |
| 2023/0291064 A1* | 9/2023 | Kim | H01M 10/6555 |
| 2023/0405968 A1* | 12/2023 | Ahn | H01M 50/242 |

FOREIGN PATENT DOCUMENTS

| | | | | |
|---|---|---|---|---|
| JP | 2024067423 A | * | 5/2024 | |
| KR | 2020078344 A | * | 7/2020 | H01M 10/052 |
| KR | 10-2022-0027816 A | | 3/2022 | |
| KR | 10-2022-0169704 A | | 12/2022 | |
| KR | 10-2023-0009760 A | | 1/2023 | |
| KR | 2023009760 A | * | 1/2023 | H01M 10/625 |
| KR | 20230009760 A | * | 1/2023 | |
| KR | 2024083790 A | * | 6/2024 | H01M 50/105 |
| WO | WO 2022/203278 A1 | | 9/2022 | |

OTHER PUBLICATIONS

English translation of KR20200078344A—battery pack for a vehicle; Samsung SDI Co LTD; Jul. 1, 2020 (Year: 2020).*
English translation of JP 2022094716A—Battery pack structure; Nissan; Jun. 27, 2022 (Year: 2022).*
English translation of JP2024067423A—On board battery pack; May 17, 2024 with priority to Nov. 4, 2022 (Year: 2024).*
English Translation of KR 20030009760 A—Battery Module with Reinforced Safety; LLG Energy Solution LTD; Jan. 17, 2023 (Year: 2023).*
Extended European Search Report issued in corresponding EP Application No. 24161587.1, dated Aug. 9, 2024, 9 pages.
Korean Office Action for KR Patent Application No. 10-2023-0044904, dated Aug. 22, 2024, 5 pages.

* cited by examiner

RECHARGEABLE BATTERY PACK

CROSS-REFERENCE TO RELATED APPLICATION

The present application claims priority to and the benefit of Korean Patent Application No. 10-2023-0044904, filed on Apr. 5, 2023, in the Korean Intellectual Property Office, the entire content of which is herein incorporated by reference.

BACKGROUND

1. Field

Aspects of embodiments of the present disclosure relate to a rechargeable battery pack.

2. Description of Related Art

A rechargeable battery is a battery that is designed to be repeatedly charged and discharged, unlike a primary battery. Small-capacity secondary batteries are used in small, portable electronic devices, such as mobile phones, notebook computers, and camcorders. High-capacity and high-density secondary batteries are used, as an example, for power and/or energy storage for driving motors in hybrid and electric vehicles.

A rechargeable battery may be used as a rechargeable battery module including a plurality of battery cells connected together in series and/or parallel to drive a motor of, for example, a hybrid vehicle requiring relatively high energy density. For example, a rechargeable battery module includes a stack of a plurality of battery cells in a frame, the number of battery cells being provided based on a desired amount of power to implement a relatively high-output rechargeable battery module (e.g., for an electric vehicle).

Such rechargeable battery modules are connected in series and/or parallel within a pack frame manufactured by various methods to form a rechargeable battery pack. For example, various types of rechargeable battery modules suitable for a rechargeable battery pack are being manufactured.

The rechargeable battery pack includes a pack frame accommodating battery cells and a pack cover (also called a top cover). The pack frame accommodates rechargeable battery modules arranged in a horizontal or vertical direction, and the pack cover is fastened to the pack frame with a fastening member to protect the rechargeable battery module from external impacts.

Because the rechargeable battery pack is relatively large, the pack cover is vertically fastened to the pack frame to reinforce the rigidity of the rechargeable battery pack. The pack cover should maintain stability against a load in the vertical direction of the pack, and for this purpose, a certain distance is provided between the pack cover and vehicle parts.

The distance above the pack cover (e.g., the space above the pack cover) is set to a distance to absorb the vertical force so that no load is applied to the rechargeable battery pack, module, or battery cell when a vertical force is generated. The pack frame includes a pack vent including a membrane to prevent damage to the rechargeable battery pack due to a difference in internal pressure according to, for example, changes in altitude. The pack vent also discharges high-temperature gas discharged from cell vents in event (e.g., thermal runaway) situations.

SUMMARY

Embodiments of the present disclosure provide a rechargeable battery pack that prevents heat propagation between adjacent battery cells.

A rechargeable battery pack, according to an embodiment of the present disclosure, includes: a plurality of battery cells, each of the battery cells including a cell vent; a pack frame accommodating the battery cells and including a pack vent; and a pack cover coupled to the pack frame and covering the battery cells. The pack cover includes a first member formed of a first elongation material having a first elongation and a second member formed of a second elongation material having a second elongation that is larger than the first elongation.

The first member and the second member of the pack cover may be alternately arranged along a first direction in which the battery cells are stacked.

The first member and the second member may be connected to each other by welding or a clad metal.

The first member may be a hot-dip galvanized steel sheet, and the second member may be a stainless steel sheet.

The second member may be arranged above the cell vents of the battery cells.

The second member of the pack cover may be arranged above the cell vent by a first distance.

The first member may have a first elongation range of 5% to 28%, and the second member may have a second elongation range of 40% to 120%.

The second elongation may be 1.4 to 24 times the first elongation.

The first member may have a first elongation range of 5% to 28%, a tensile strength range of 750 Mpa to 1,050 Mpa, and a yield strength range of 500 Mpa to 740 Mpa.

The second member may have the tensile strength range of 1,160 Mpa to 1,900 Mpa.

The second member may have a tensile strength that is higher than the tensile strength of the first member.

The tensile strength of the second member may be 1.1 to 2.6 times higher than the tensile strength of the first member.

The second member may have a yield strength range of 200 Mpa to 450 Mpa.

The second member may have a yield strength that is 27% to 90% of the yield strength of the first member.

A difference between the second elongation and the first elongation may be in a range of 12% to 115%, and a difference between a yield strength of the second member and the yield strength of first member may be in a range of 50 Mpa to 540 MPa.

The pack cover may further include a first non-elongation portion at a center in a second direction thereof crossing the first direction, and the first non-elongation portion may be formed of the first member having the first elongation. The first non-elongation portion may have a maximum width in the second direction at the center in the first direction and may have a width that gradually narrows toward both ends thereof in the first direction.

The pack cover may be fixed to the pack frame by a fastening member, and the pack cover may further include a second non-elongation portion around the fastening member. The second non-elongation portion may be formed of the first member having the first elongation.

A rechargeable battery pack, according to embodiments of the present disclosure, may include a pack cover including a second member formed of a second elongation material having a second elongation that is larger than a first elongation of a first member. The second member of the second elongation material that is relatively close to the battery cell is elongated if the battery cell underdoes a cell event, and thereby, an induction passage for the cell event gas may be expanded. Therefore, the cell event gas is promptly guided to the pack vent through the expanded induction passage and heat propagation between battery cells may be prevented.

DETAILED DESCRIPTION

Hereinafter, the present disclosure will be described more fully hereinafter with reference to the accompanying drawings, in which embodiments of the present disclosure are shown. As those skilled in the art would realize, the described embodiments may be modified in various different ways, all without departing from the spirit and scope of the present disclosure. Thus, the drawings and description are to be regarded as illustrative in nature and not restrictive.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Figure 1:
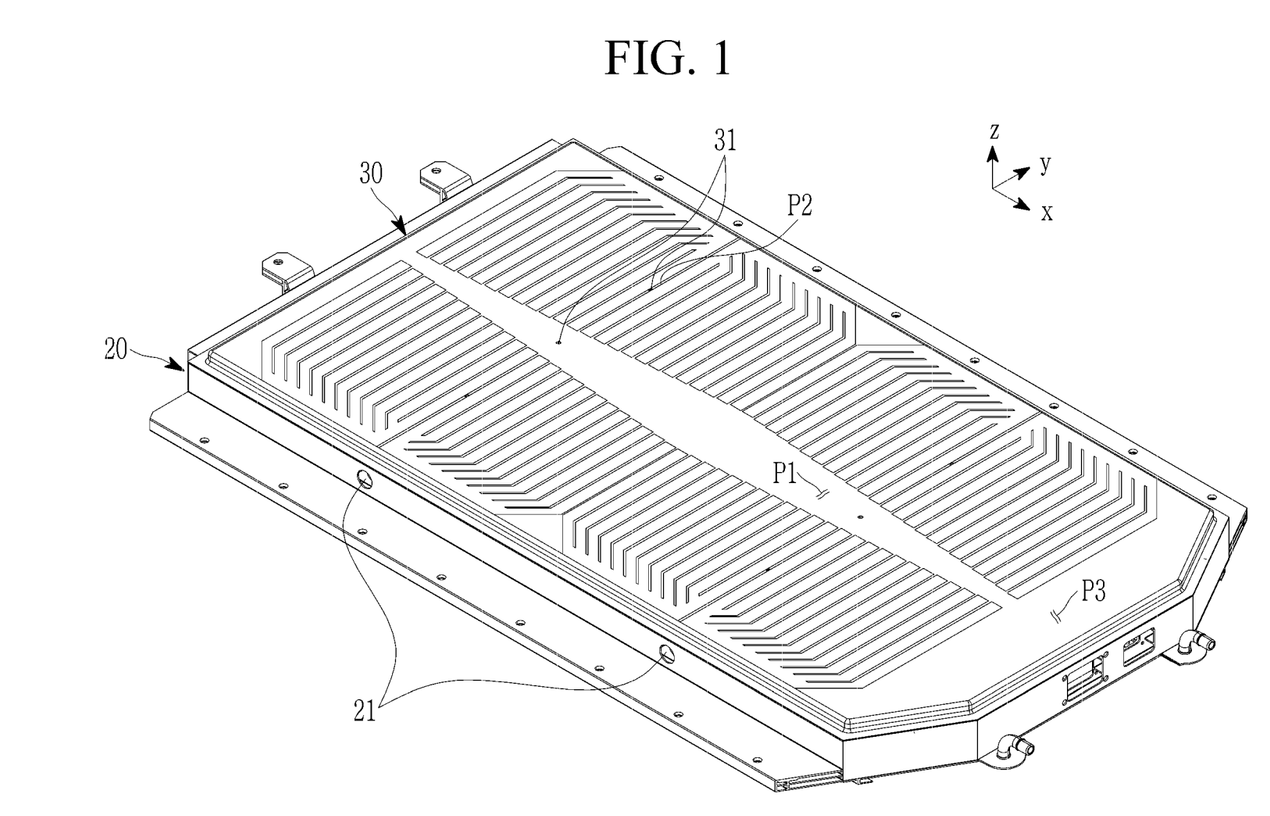
FIG. 1 is a perspective view of a rechargeable battery pack according to an embodiment.
Figure 2:
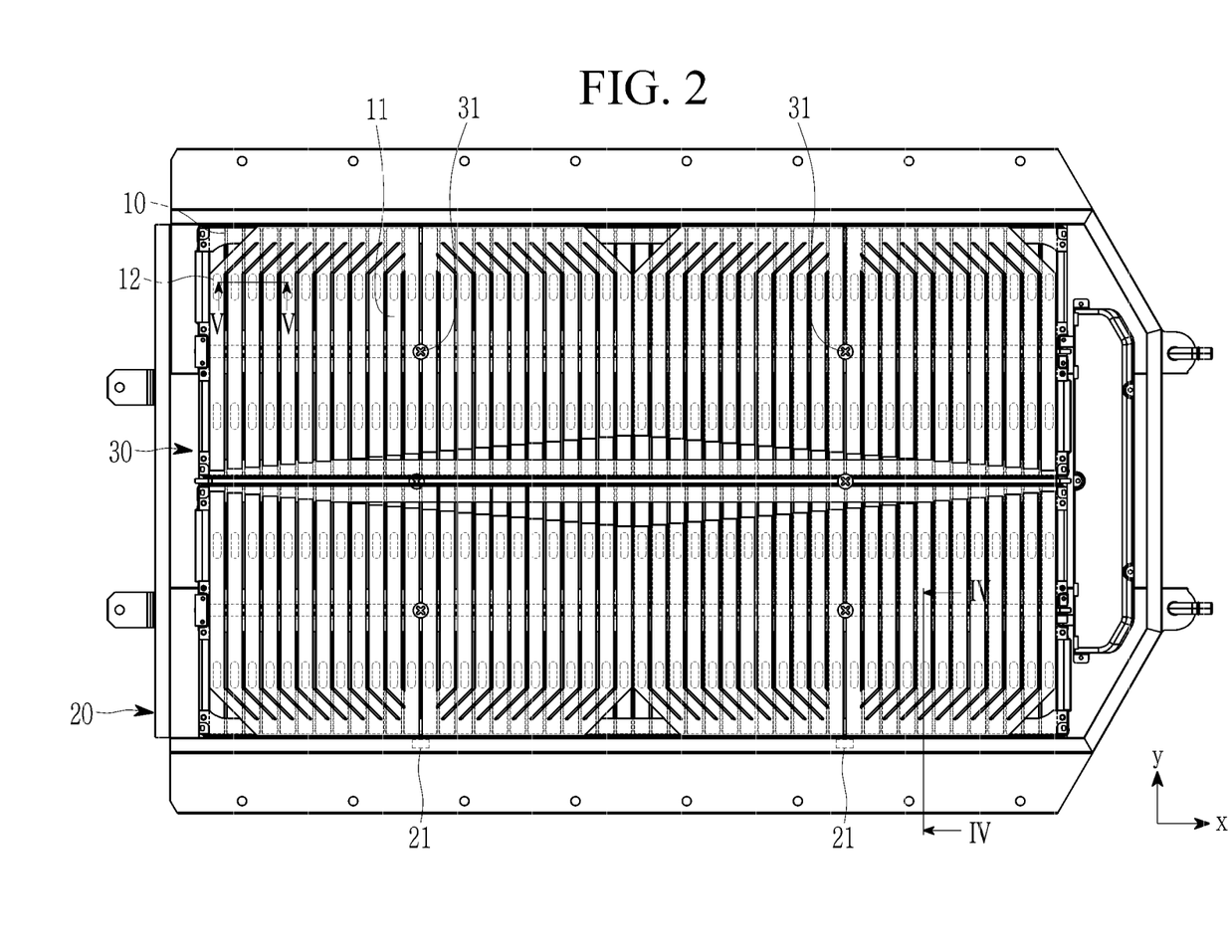
FIG. 2 is a top plan view of the rechargeable battery pack shown in FIG. 1.
Figure 3:
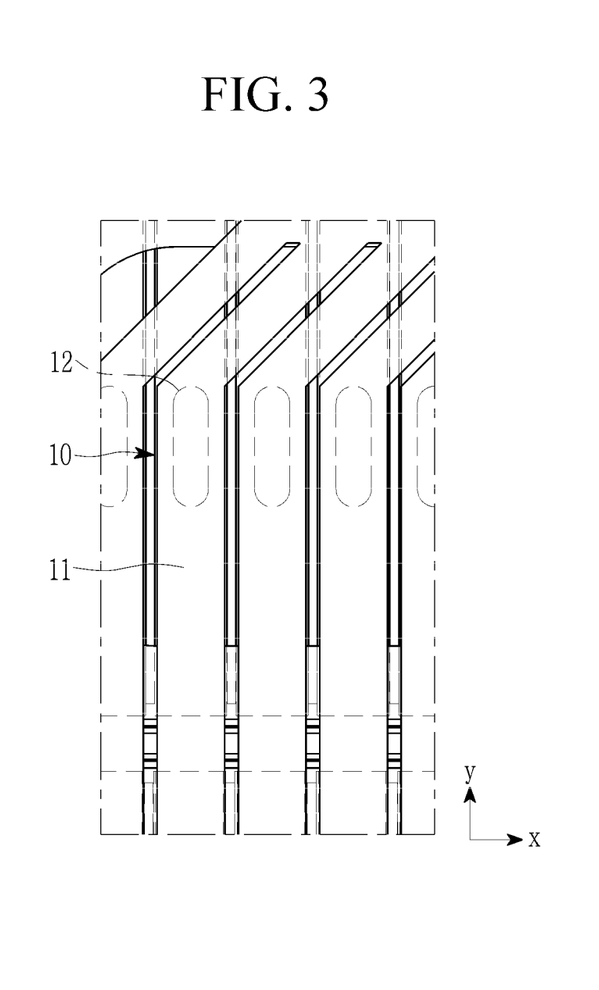
FIG. 3 is an enlarged plan view of a part of the rechargeable battery pack shown in FIG. 2.

FIG. 1 is a perspective view of a rechargeable battery pack according to an embodiment. FIG. 2 is a top plan view of the rechargeable battery pack shown in FIG. 1. FIG. 3 is an enlarged plan view of a part of the rechargeable battery pack shown in FIG. 2. Referring to FIG. 1 to FIG. 3, a rechargeable battery pack, according to an embodiment, includes a plurality of battery cells 10, a pack frame 20 configured to accommodate the battery cells 10, and a pack cover 30 coupled to the pack frame 20.

A battery cell 10 is a rechargeable (or secondary) battery and has a cell vent 12 on a cap plate 11. The cell vent 12 is configured to discharge an internal gas during a cell event (e.g., a thermal runaway event). The pack frame 20 is configured to accommodate the battery cells 10 and is provided with a pack vent 21. The pack vent 21 discharges the internal cell event gas to the outside of the pack frame 20, thereby preventing a secondary event of other battery cells 10 (e.g., thereby preventing propagation of the thermal runaway to adjacent battery cells 10).

The pack cover 30 covers the battery cells 10 and is coupled to the pack frame 20 by a fastening member 31. The pack cover 30 and the pack frame 20 are coupled to each other to form a closed and sealed space, and the battery cells 10 are accommodated in and exposed from the closed and sealed space. For example, the internal gas generated due to the cell event is discharged to the closed and sealed space through the cell vent 12 and may then be promptly discharged to the outside through the pack vent 21.

Figure 4:
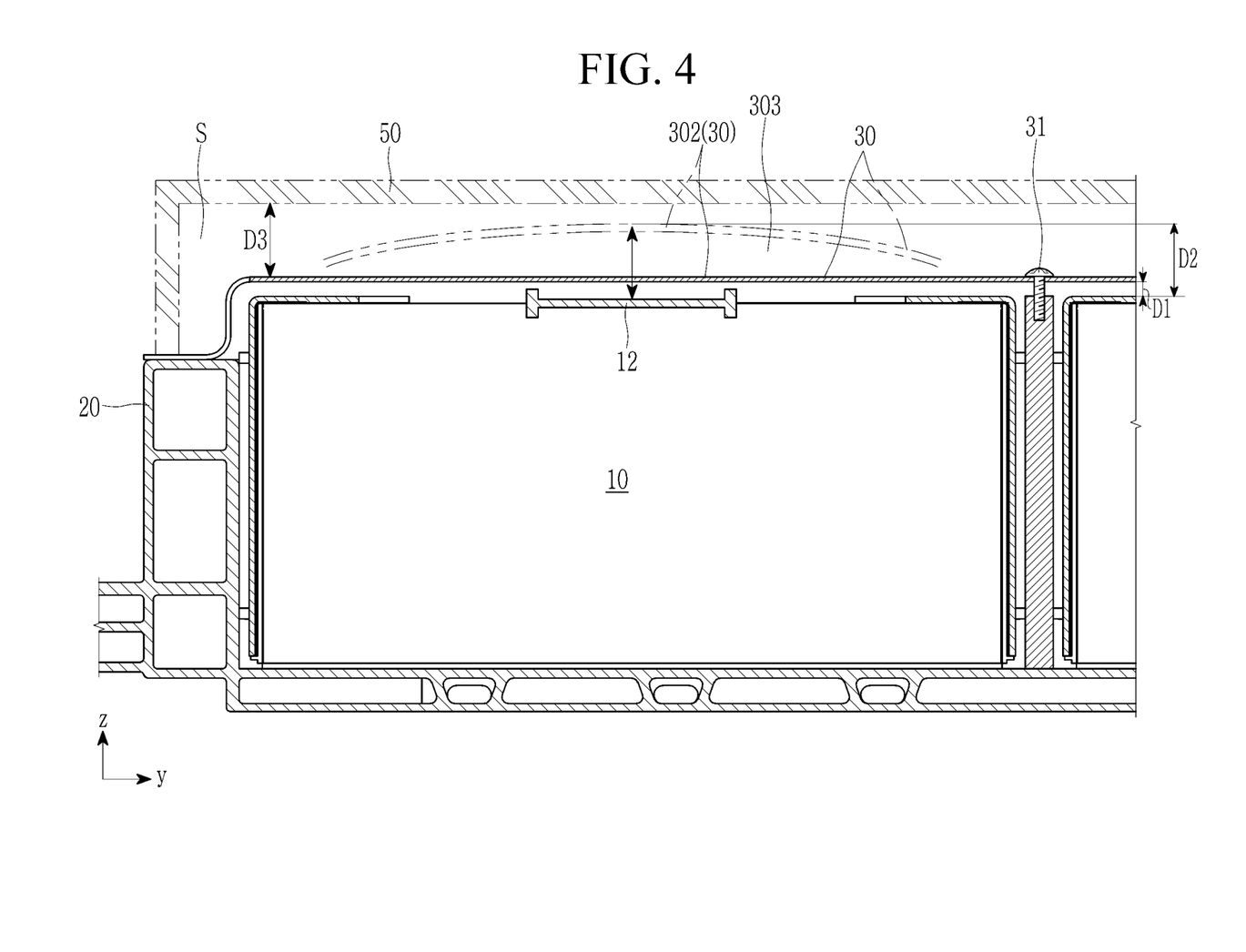
FIG. 4 is a cross-sectional view taken along the line IV-IV of FIG. 2.

FIG. 4 is a cross-sectional view taken along the line IV-IV of FIG. 2. Referring to FIG. 4, as the capacity of the battery cells 10 increases, a distance between the pack cover 30 and the battery cells 10 is gradually reduced (e.g., as that battery cells 10 swell, the distance between the pack cover 30 and the battery cells 10 is gradually reduced).

For example, according to market and customer requirements, the allowable first distance D1 between the upper end (or upper surface) of the battery cell 10 and the pack cover 30 in normal operating conditions of the rechargeable battery pack may be in a range of about 4 to about 15 mm. However, a second distance D2 to maintain the performance of the rechargeable battery pack and to ensure it is capable of responding to (e.g., to ensure that it can contain battery cell(s) 10 undergoing) cell event situations may be in a range of about 22 to about 40 mm.

For example, a difference D2−D1 between the second distance D2, which is provided to maintain the performance of the rechargeable battery pack, and the first distance D1 is allowed. The first distance D1 may be smaller than the second distance D2 (e.g., D2>D1).

In such an embodiment, when a cell event occurs, the cell vent 12 may be blocked by foreign substances ejected from the battery cell 10, and heat propagation may occur to the adjacent battery cells 10 due to the blockage in the high temperature gas vent path.

According to embodiments of the present disclosure, the rechargeable battery pack operates normally even though the first distance D1 is smaller than the second distance D2 (e.g., D2>D1) and prevents heat propagation even during a cell event situation.

Referring back to FIG. 4, a space S having a third distance D3 sufficient to secure the second distance D2 is provided between the pack cover 30 and the vehicle cover 50 provided in the vehicle. According to embodiments of the present disclosure, the rechargeable battery pack copes with a cell event by utilizing the space S formed by the third distance D3.

Therefore, in an embodiment, when a cell event occurs, remnants of electrode plates or separators that may be ejected through the cell vent 12 are prevented from being stacked on (e.g., impacted on) the pack cover 30 and the cell vent 12 to completely block the cell vent 12 and/or reducing the space above the battery cell 10. In addition, the rechargeable battery pack, according to embodiments of the present disclosure, prevents clogging of the cell vent 12, thereby preventing flames and hot gases from being dispersed outside (e.g., from being uncontrollably dispersed outside) the cell vent 12.

The rechargeable battery pack, according to embodiments of the present disclosure, prevents the temperature of the battery cell 10 in which the cell event is occurring from further increasing, prevents rupture of the battery cell 10 due to the pressure and temperature of the hot gas, and prevents heat propagation to adjacent battery cells 10.

For this purpose, the second distance D2 is formed (or determined) by adding a fraction (e.g., D3*x) of the third distance D3 to the first distance D1 (e.g., D2=D3*xD1, where x is greater than 0 and less than 1). Different elongations of the pack cover 30 are applied such that the pack cover 30 has different shapes (see, e.g., the solid line and double-dotted line in FIG. 4) during normal operation and during abnormal operation, such as a cell event.

Figure 5:
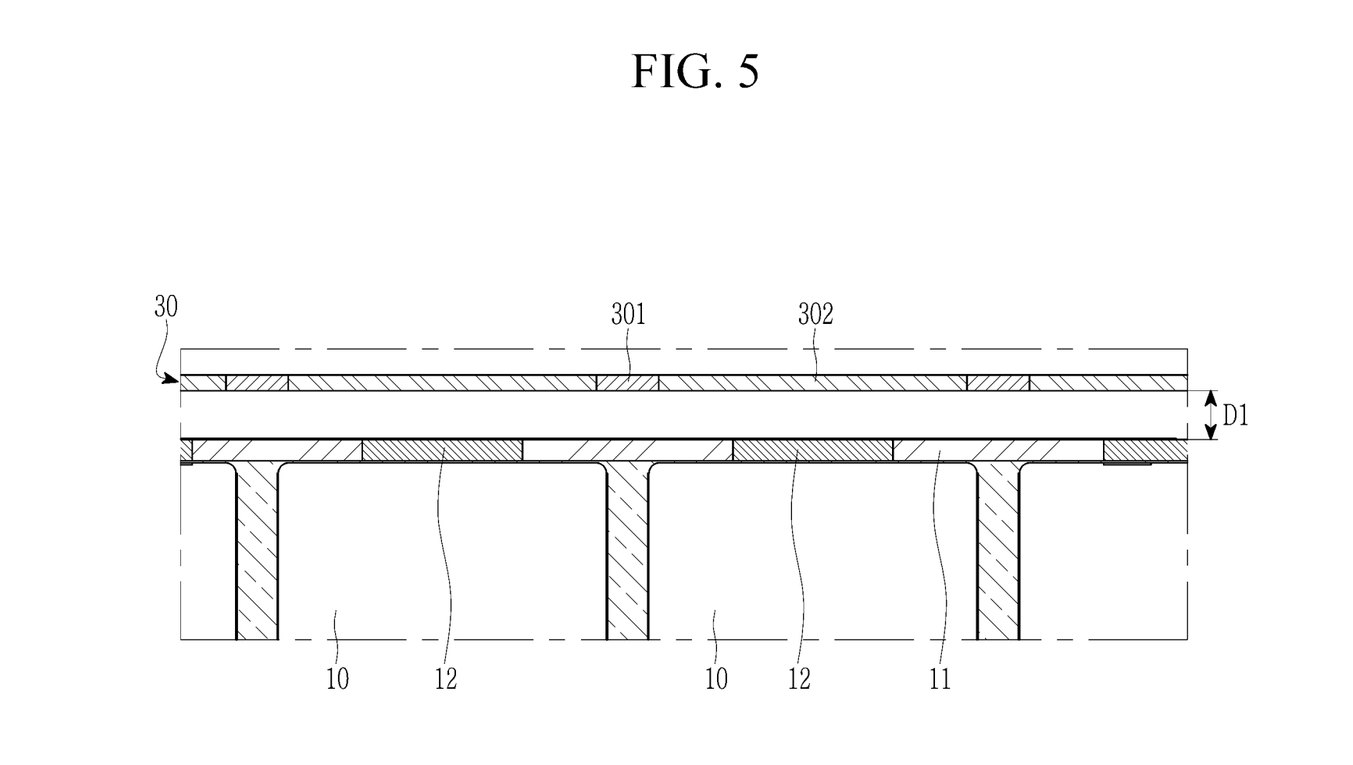
FIG. 5 is a cross-sectional view taken along the line V-V of FIG. 2.

FIG. 5 is a cross-sectional view taken along the line V-V of the pack frame shown in FIG. 2. Referring to FIG. 2 and FIG. 5, the pack cover 30 includes a first member 301 and a second member 302. The first member 301 is formed of a first elongation material having a first elongation, and the second member 302 is formed of a second elongation material having a second elongation that is larger than (or greater than) the first elongation. For example, the pack cover 30 is formed of materials having different elongations. As used herein, "elongation" refers to a material's ability to stretch from its original length to the point of failure and is often represented as a percentage.

The pack cover 30 alternately includes the first member 301 and the second member 302 along a first direction (e.g., the x-axis direction in the drawings) in which the battery cells 10 are stacked. The first member 301 and the second member 302 may be connected to each other by friction welding, laser welding, or a clad metal.

The first member 301 may be formed of a hot-dip galvanized steel sheet, for example, CGCHS60DP, having the first elongation. The second member 302 may be formed of a stainless steel sheet, for example, SUS290, having the second elongation.

The second member 302 is disposed above the cell vent 12 in the battery cell 10 such that the second member 302 may be stretched more promptly in response to the discharge pressure of the cell vent 12 during the cell event. The second member 302 of the pack cover 30 forms the first distance D1, that is, a height difference with respect to the cell vent 12.

The first elongation range of the first member 301 may be about 5% to about 28%, and the second elongation range of the second member 302 may be about 40% to about 120%. The second elongation may be in a range of about 1.4 to about 24 times the first elongation. The second member 302 is configured to form and provide an additional passage 303 (see, e.g., FIG. 4) in the pack cover 30 in the cell event situation due to its relatively high second elongation.

When the first elongation of the first member 301 is lower than about 5%, damage to the first member 301 may occur during the cell event due to insufficient first elongation. When the first elongation of the first member 301 is higher than about 28%, formation of the additional passage 303 during the cell event may be less than desired or necessary, for example, to prevent clogging of the cell vent 12.

When the second elongation of the second member 302 is lower than about 40%, in case of a cell event, the minimum value of the second distance D2 may not be secured, and thereby blockages of the cell vent 12 and thermal runaway may occur due to the discharging of hot gas and the accumulation of foreign substances. When the second elongation of the second member 302 exceeds about 120%, the amount of deformation may be maximized, but the manufacturing cost may be excessively increased.

In FIG. 4, the additional passage 303 is illustrated as being a space between the solid line state in the normal operation (i.e., before deformation) and the double-dotted line state during the cell event (i.e., after deformation). Due to the second member 302, the additional passage 303 forms a maximum distance in a second direction (e.g., the y-axis direction in the drawings) at a center of the battery cell 10 and the cell vent 12 therein. Therefore, the discharge from the cell vent 12 is smooth.

The first member 301 may have an upper limit value of the first elongation within a range that does not impair the strength of the pack cover 30, and the second member 302 may have a lower limit value of the second elongation within a range that does not impair the elongation of the pack cover 30. Also, the first and second members 301 and 302 may be set to multiples within a range enabling relative elongation.

For example, the first member 301 may have the first elongation in a range of about 5% to about 28%, a tensile strength range of about 750 Mpa to about 1,050 Mpa, which refers to the maximum force applied before breaking, and a yield strength range of about 500 Mpa to about 740 Mpa, which refers to the maximum force that can be applied to the material while enabling its return to the original state after releasing.

When the tensile strength of the first member 301 is lower than about 750 Mpa, in the case of a cell event, the first member 301 may be damaged in a state in which the second member 302 is not sufficiently stretched. If the additional passage 303 is not sufficiently secured, the flame may flow out through the damaged part. Although the higher the tensile strength of the first member 301, generally, the better, if it exceeds about 1,050 Mpa, the material price may increase significantly.

Although the lower the yield strength of the first member 301, the more promptly the second distance D2 may be secured at the time of a cell event, it may be difficult or require high cost to prepare a material having a large difference between the tensile strength and the yield strength required at the time of the cell event. When the yield strength of the first member 301 exceeds about 740 Mpa, the second distance D2 may not be sufficiently secured during a cell event.

The second member 302, connected to the first member 301, may have a tensile strength in a range from about 1,160 Mpa to about 1,900 Mpa. The tensile strength of the second member 302 is higher than the tensile strength of the first member 301. The tensile strength of the second member 302 may be in a range of about 1.1 to about 2.6 times higher than the tensile strength of the first member 301.

A yield strength of the second member 302 may be in a range of about 200 Mpa to about 450 Mpa. The yield strength of the second member 302 may be in a range of about 27% to about 90% of the yield strength of the first member 301. For example, in the second member 302 and the first member 301, the difference between the second and first elongations may be in a range of about 12% to about 115%. In the second member 302 and the first member 301, a difference of the yield strength may be in a range of about 50 Mpa to about 540 MPa.

The difference of about 115% between the second and first elongations and the difference in the yield strength of about 540 MPa are maximum differences by which the second member 302 may expand and may vary depending on the size of the third distance D3. When the third distance D3 is relatively large, the third distance D3 cannot be fully utilized if the difference between the second and first elongations and the difference in the yield strength is relatively small. For example, when the third distance D3 is relatively large, the cost of the second member 302 may increase as the difference of the second and first elongations and the difference in the yield strength increases.

Referring back to FIG. 1 and FIG. 2, the pack cover 30 includes a first non-elongation portion P1 at a center thereof in the second direction (e.g., the y-axis direction in the drawings) crossing the first direction (e.g., the x-axis direction in the drawings). The first non-elongation portion P1 is formed of the first member 301 having the first elongation and provides strength in the central portion of the pack cover 30.

As an example, the first non-elongation portion P1 may form a maximum width in the second direction (e.g., the y-axis direction) at the center in the first direction (e.g., the x-axis direction) and may have a width gradually narrowing toward both ends in the first direction (e.g., the x-axis direction). The first non-elongation portion P1 forming a minimum width is connected to the outer portion P3 of the pack cover 30 provided at both ends in the first direction (e.g., the x-axis direction).

Because the outer portion P3 does not include the second member 302, it has higher mechanical strength than the portion including the second member 302. Therefore, because the first non-elongation portion P1 is connected to the outer portion P3, mechanical strength of the pack cover 30 may be stably maintained.

The pack cover 30 is fixed to the pack frame 20 by the fastening member 31 and further includes a second non-elongation portion P2 around the fastening member 31. As an example, the second non-elongation portion P2 is formed of the first member 301 having the first elongation and may stably maintain rigidity between the pack cover 30 and the pack frame 20 by the fastening member 31.

While this disclosure has been described in connection with what is presently considered to be practical embodiments, it is to be understood that the present disclosure is not limited to the disclosed embodiments. On the contrary, the present disclosure is intended to cover various modifications and equivalent arrangements included within the scope of the appended claims and their equivalents.

DESCRIPTION OF SOME REFERENCE SYMBOLS

10: battery cell
11: cap plate
12: cell vent
20: pack frame
21: pack vent
30: pack cover
31: fastening member
50: vehicle cover
301: first member
302: second member
303: additional passage
D1: first distance
D2: second distance
D3: third distance
P1: first non-elongation portion
P2: second non-elongation portion
P3: outer portion S: space

What is claimed is:

1. A rechargeable battery pack comprising:
a plurality of battery cells arranged along a first direction, each of the battery cells comprising a cell vent;
a pack frame accommodating the battery cells and comprising a pack vent; and
a pack cover coupled to the pack frame and covering the battery cells, the pack cover comprising a first member formed of a first elongation material having a first elongation and a second member formed of a second elongation material having a second elongation that is larger than the first elongation,
wherein, at an area above the battery cells in a direction perpendicular to the first direction, the first member and the second member of the pack cover are alternately arranged along the first direction,
wherein the second member is arranged above the cell vents of the battery cells, and
wherein the first member is arranged above an area between two adjacent ones of the battery cells and between two adjacent portions of the second member.

2. The rechargeable battery pack as claimed in claim 1, wherein the first member and the second member are connected to each other by welding or a clad metal.

3. The rechargeable battery pack as claimed in claim 1, wherein the first member is a hot-dip galvanized steel sheet, and
wherein the second member is a stainless steel sheet.

4. The rechargeable battery pack as claimed in claim 1, wherein the second member of the pack cover is arranged above the cell vent by a first distance.

5. The rechargeable battery pack as claimed in claim 1, wherein the first member has a first elongation range of 5% to 28%, and
wherein the second member has a second elongation range of 40% to 120%.

6. The rechargeable battery pack as claimed in claim 1, wherein the second elongation is 1.4 to 24 times the first elongation.

7. The rechargeable battery pack as claimed in claim 1, wherein the first member has a first elongation range of 5% to 28%, a tensile strength range of 750 Mpa to 1,050 Mpa, and a yield strength range of 500 Mpa to 740 Mpa.

8. The rechargeable battery pack as claimed in claim 7, wherein the second member has the tensile strength range of 1,160 Mpa to 1,900 Mpa.

9. The rechargeable battery pack as claimed in claim 7, wherein the second member has a tensile strength that is higher than the tensile strength of the first member.

10. The rechargeable battery pack as claimed in claim 9, wherein the tensile strength of the second member is 1.1 to 2.6 times higher than the tensile strength of the first member.

11. The rechargeable battery pack as claimed in claim 7, wherein the second member has a yield strength range of 200 Mpa to 450 Mpa.

12. The rechargeable battery pack as claimed in claim 11, wherein the second member has a yield strength that is 27% to 90% of the yield strength of the first member.

13. The rechargeable battery pack as claimed in claim 7, wherein a difference between the second elongation and the first elongation is in a range of 12% to 115%, and
wherein a difference between a yield strength of the second member and the yield strength of first member is in a range of 50 Mpa to 540 MPa.

14. The rechargeable battery pack as claimed in claim 1, wherein the pack cover further comprises a first non-elongation region at a center in a second direction thereof, the second direction crossing the first direction, the first non-elongation region corresponding to a location of the first member having the first elongation, and
wherein the first non-elongation region has a maximum width in the second direction at the center in the first direction and has a width that gradually narrows toward both ends thereof in the first direction.

15. The rechargeable battery pack as claimed in claim 14, wherein the pack cover is fixed to the pack frame by a fastening member, and
wherein the pack cover further comprises a second non-elongation region around the fastening member, the second non-elongation region corresponding to another location of the first member having the first elongation.

* * * * *